US010378145B2

(12) United States Patent
Crouzet et al.

(10) Patent No.: US 10,378,145 B2
(45) Date of Patent: Aug. 13, 2019

(54) METALLIZED TEXTILES AND PROCESS FOR MANUFACTURING SAME

(71) Applicant: MERMET, Veyrins-Thuellin (FR)

(72) Inventors: Alain Crouzet, Le Touvet (FR); Francois-Xavier Damour, Lyons (FR)

(73) Assignee: MERMET, Veyrins-Thuellin (FR)

( * ) Notice: Subject to any disclaimer, the term of this patent is extended or adjusted under 35 U.S.C. 154(b) by 521 days.

(21) Appl. No.: 15/034,958

(22) PCT Filed: Nov. 17, 2014

(86) PCT No.: PCT/FR2014/052928
§ 371 (c)(1),
(2) Date: May 6, 2016

(87) PCT Pub. No.: WO2015/071615
PCT Pub. Date: May 21, 2015

(65) Prior Publication Data
US 2016/0273155 A1 Sep. 22, 2016

(30) Foreign Application Priority Data
Nov. 18, 2013 (FR) .................................. 13 61257

(51) Int. Cl.
| | | |
|---|---|---|
| *D06M 11/83* | (2006.01) | |
| *C03C 25/1095* | (2018.01) | |
| *D06P 3/80* | (2006.01) | |
| *D06M 15/19* | (2006.01) | |
| *D06M 15/507* | (2006.01) | |
| *D06M 15/564* | (2006.01) | |
| *D06M 15/59* | (2006.01) | |
| *C03C 25/54* | (2006.01) | |

(52) U.S. Cl.
CPC ......... *D06M 11/83* (2013.01); *C03C 25/1095* (2013.01); *C03C 25/54* (2013.01); *D06M 15/19* (2013.01); *D06M 15/507* (2013.01); *D06M 15/564* (2013.01); *D06M 15/59* (2013.01); *D06P 3/80* (2013.01); *D06M 2200/30* (2013.01); *D06M 2400/01* (2013.01)

(58) Field of Classification Search
CPC .... D06M 11/83; D06M 15/19; D06M 15/507; D06M 15/564; D06M 15/59; D06M 2200/30; D06M 2400/01; C03C 25/1095; C03C 25/54
See application file for complete search history.

(56) References Cited

U.S. PATENT DOCUMENTS

| | | | | |
|---|---|---|---|---|
| 4,816,124 A | * | 3/1989 | Manabe | D06M 11/83 204/192.1 |
| 2014/0308867 A1 | * | 10/2014 | Van Emmerick | C23C 14/20 442/189 |

FOREIGN PATENT DOCUMENTS

| | | |
|---|---|---|
| EP | 1245720 | * 10/2002 |
| FR | 2791353 | 9/2000 |
| GB | 2138032 | 10/1984 |
| JP | H05-9829 | 1/1993 |
| JP | H07-102380 | 4/1995 |

OTHER PUBLICATIONS

International Search Report dated Apr. 8, 2015, corresponding to International Patent Application No. PCT/FR2014/052928.

* cited by examiner

*Primary Examiner* — Cephia D Toomer
(74) *Attorney, Agent, or Firm* — Ladas & Parry LLP; Malcolm J. MacDonald

(57) ABSTRACT

The present invention provides a textile metallized on at least one of its faces comprising a textile layer of inorganic fibers and a metallic layer, the textile being characterized in that the connection between the textile layer and the metallic layer is provided by a polymeric intermediate layer formed by a matrix having at least one coupling polymer in which at least one flame retardant agent is distributed, said coupling polymer being bonded by chemical bonds firstly to the textile layer and secondly to the metallic layer. The present invention also provides the method of fabricating this metallized textile.

18 Claims, No Drawings

METALLIZED TEXTILES AND PROCESS FOR MANUFACTURING SAME

This application is a 371 of PCT/FR2014/052928 filed on Nov. 17, 2014, which claims priority to French application number 1361257, filed Nov. 18, 2013.

The present invention relates to the technical field of textiles adapted to provide sun protection. More precisely, the present invention relates to novel metallized textiles and their method of fabrication.

The performance of sun protection cloth is characterized in particular by thermal indices that characterize the transmitted proportion (Ts) and the reflected proportion (Rs) of solar radiation. The greater the value of Rs, the higher the performance of a blind. This value of Rs is essentially a function of the outside surface state of the blind. It is generally accepted that Rs values of about 70% represent the maximum values that can be reached for the goods that are presently available on the market.

Another important characteristic of sun protection cloth is its fire resistance. Fire behavior is characterized by various standardized tests. In France, fire behavior is evaluated using the NFP 92507 standard, among others, which serves to obtain an "M" classification. For sun protection cloth, level M0 or level M1 is generally required. European standard EN 13.501-1 also serves to define a classification, known as a "Euroclass rating", for the fire resistance of flexible materials. The looked-for classification level is A2s1d0.

At present, two techniques are mainly known for obtaining an Rs value of 70% for sun protection cloth.

The first makes use of a deposit of metal on the outside face of the blind. Several technologies enable such metal deposition to be performed:

Depositing a binder containing a metal filler, in particular an aluminum filler. Under such circumstances, the binder, which is of organic nature, is combustible. Furthermore, seeking to obtain a metallized appearance makes it impossible to incorporate flame retardant agents in the deposition formulation. It is therefore not possible to obtain a fabric presenting a flame retardant level of M0 or A2s1d0 type on the metallized face of such a fabric. Nevertheless, the M1 level can be achieved by using halogen compounds.

Applying a spray obtained by dispersing fine metal particles, such as particles of aluminum, in a binder that is generally of polymer type. As in the above technology, using an organic binder as the medium for dispersing metal particles means that it is not possible to obtain a flame retardant level of M0 or A2s1d0 type on the metallized face of the fabric. The M1 level can be reached only for substances that are strongly halogenated and fireproofed (e.g. polyvinylchloride(s) (PVCs) with fireproofing based on antimony trioxide and zinc hydroxystannate).

Depositing a transfer film made up of a layer of aluminum and a polymer binder on the surface of the fabric. As with the two above technologies, the presence of an organic binder means that it is not possible to obtain an M0 or A2s1d0 classification and the M1 classification can be reached only with halogenated compounds.

Depositing an aluminum layer on the surface of the fabric by a vacuum metallization operation. Unlike the above-described technologies, this mode of deposition enables the fabric to be covered in a layer of pure aluminum. The difficult point with this technology is the adhesion of the metal layer to the surface of the textile. At present, the solutions used for overcoming this lack of adhesion lead to an organic coating being applied at the interface, serving to bond together the textile core and the metal layer. The organic layer on the metallized face of the fabric makes it impossible to obtain a classification of M0, M1, or A2s1d0 type.

The second known technique for obtaining an Rs value of 70% for sun protection cloth uses a deposit on its outside surface of an opaque white layer that is filled with a large amount of white pigment, such as rutile type titanium dioxide, zinc sulfide, or barium sulfate. Under such circumstances, it is necessary to use an organic compound to provide cohesion for the layer containing the mineral fillers. Under such circumstances, the presence of the organic compound prevents a "fire" classification of M0 type in accordance with the standard NFP 92.507, or of A2s1d0 type in accordance with the standard EN 13.501-1, for the textile surface.

Thus, at present, no technical solution exists that makes it possible to obtain a fabric that presents simultaneously both an Rs index that is greater than or equal to 70%, which requires the presence of a metal at the surface, and also, without using a compound that includes a halogen, a fire classification of M0 or M1 type in accordance with the standard NFP 92.507, or of A2s1d0 type in accordance with the standard EN 13.501-1.

Mention may also be made of the following documents that address producing metallized fabrics. Document JP H07 102380 describes a glass fiber textile material that is treated with a solution containing both a water soluble urethane resin and a water soluble amino or epoxy silane as a coupling agent. After treatment, the fiber material is dried and is subjected to heat treatment, and then a metal film is deposited by autocatalytic plating (or "electroless" plating). In the summary of that document it is stated that the metal film as formed in that way presents a significant improvement in terms of adhesion properties. Under such circumstances, since the polyurethane used is in aqueous solution, drying causes the solvent to evaporate and leads to a continuous film being formed that completely covers the surface of the glass fabric. It is specified in that document that the silane is used for creating cross-linking between the glass fabric and the polyurethane. Furthermore, in that document, the metal layer is made by autocatalytic plating, which is not suitable for depositing aluminum and leads to deposits that are thick.

Document JP H05 9829 describes treating a glass fiber textile on each of its faces with a non-flammable solution containing calcium silicate and a water-dispersible polyester urethane resin, followed by metallization. The metal adheres via the polyurethane, without chemical bonding. The concentration of calcium silicate is described as being a critical point for obtaining fireproof performance and mechanical properties for the product. It is stated that if there is less than 40% by weight of calcium silicate, then non-flammability is no longer guaranteed, and if there is more than 60% by weight of calcium silicate, then it becomes impossible to fix the silicate on the fabric.

In this context, the invention proposes a metallized textile material and a method of fabricating such a material, which material presents secure adhesion of the metal layer on the textile layer and is compatible with obtaining a fire classification of M0 or A2s1d0 type, or that is free of halogen and compatible with a classification of M1 type.

The invention provides a textile metallized on at least one of its faces comprising a textile layer of inorganic fibers and a metallic layer, the textile being characterized in that the connection between the textile layer and the metallic layer is provided by a polymeric intermediate layer formed by a matrix having at least one coupling polymer in which at least one flame retardant agent is distributed, said coupling polymer being bonded by chemical bonds firstly to the textile layer and secondly to the metallic layer.

In the context of the invention, chemical bonds are established between the various components of the metallized textile. These bonds are created by coupling agents carried by the polymer constituting the polymeric intermediate layer. Furthermore, the polymeric intermediate layer keeps the metallic layer and the textile layer separate so they are not in contact with each other.

Although metallization may be performed on both faces, the invention is particularly suitable for textiles that are metallized on only one of their faces. In the context of the invention, the chemical bonds existing firstly between the coupling polymer and the textile layer, and secondly between the coupling polymer and the metallic layer, are, in particular, covalent, hydrogen, or polar bonds.

In particular, the chemical bonds existing firstly between the coupling polymer and the textile layer, and secondly between the coupling polymer and the metal layer, are provided by M-OH functions carried by the polymer layer or by O-M-O covalent bridges, where M=Si, Al, Zr, or Ti. Preferably, M=Si.

In particular embodiments, the polymeric intermediate layer is constituted by one or more polymers having reactive functions, in particular selected from the following monovalent or divalent groups: hydroxy, carboxylic acid, amine, amide, acid anhydride, isocyanate, epoxy, caprolactam, carbodimide.

Advantageously, the polymeric intermediate layer is a polymer selected from: polyesters, polyamides, polyurethanes, polyolefins, and mixtures thereof. Nevertheless, in the context of the invention, all types of polymer carrying reactive functions can be used. Mention may be made of all polycondensates (polyester, polyamide, polyurethane), and also of all self-cross-linking polymers and also thermoplastic vulcanisates (TPVs) (polyolefins obtained by metallocene catalysis and possessing a partially vulcanized phase). An example of TPV is the Sarlink® range from Teknor Apex. Such a polymer with reactive functions is functionalized with at least one coupling agent, in particular of silane, titanate, zirconate, aluminate, or organochromium complex type, as explained below in order to correspond to the coupling polymer.

In the context of the invention, the textile may in particular be a woven fabric, a non-woven fabric, or a grid, preferably of glass fibers.

The term "grid" is used to mean an array of yarns that are crossed without interlinking, and that are usually stuck together at their points of intersection.

Nevertheless, the invention is not limited in any way to glass textiles, and it can be extended to other oxide-based inorganic textiles, in particular made of ceramic fibers, optical fibers, or fibers based on metal alloys, such as, by way of example: Fe/Ni 36 alloys or materials of nanocrystalline type. In conventional manner, the inorganic fibers may be covered in size representing less than 0.5% by weight of the fibers.

Advantageously, the metal constituting the metal layer is aluminum. In the same manner, the invention may be applied to other metal layers, in particular the metallized textile may include, taking the place of an aluminum layer, a layer of some other metal that can be deposited under low pressure, such as chromium, gold, silver, tin, or nickel, or indeed a layer of metal having shielding properties against electromagnetic waves, such as a layer of Invar (Fe/Ni 36% alloy), or of mumetal or "µ-metal" (NiFe15Mo5 or NiFe15Cu5Mo3, in particular).

In a particular embodiment the flame retardant agent(s) represent(s) 20% to 25% by weight of the weight of the polymeric intermediate layer.

In the context of the invention, the flame retardant agent(s) is/are incorporated in the polymer matrix constituting the polymeric intermediate layer. The molecules or particles corresponding to the flame retardant agent are not chemically bonded to the matrix but are held captive therein. In contrast, depending on the natures of the polymer matrix and of the flame retardant agent, they may become bonded to the polymer matrix by low energy bonds, such as covalent bonds or hydrogen bonds. It is possible to use a single flame retardant agent or a mixture of them.

The flame retardant agent(s) may be of the phosphorus or nitrogen type such as ammonium polyphosphates, melamine isocyanurate, derivatives of pentaerythritol and of melamine, or ammonium molybdates.

In preferred manner, the coupling polymer represents 1% to 25%, and preferably 5% to 6%, by weight of the total weight of the metallized textile.

Advantageously, the metallized textile of the invention presents an Rs index greater than or equal to 70%. The Rs index may be determined using the EN 410 standard. Such an Rs can be achieved by excellent reflection being obtained as a result of the presence of the surface metallic layer and by selecting a small openness factor, in particular of about 0 to 8%, and preferably less than 7%.

The present invention also provides a method of fabricating a metallized textile as defined in the context of the invention and having the following successive steps:

a) preparing a solution or a dispersion including at least one flame retardant agent and a coupling polymer or a mixture of coupling polymers, said polymer(s) carrying coupling functions capable of making chemical bonds between the polymer and the inorganic textile fibers, and coupling functions capable of making chemical bonds between the polymer and the metal, which functions may be identical or different;

b) sizing one of the faces of the inorganic fiber textile layer with the solution or dispersion prepared in step a);

c) applying heat treatment serving in particular to fix the coupling polymer chemically to the surface of the textile layer so as to fix an intermediate polymer layer on the textile layer; and d) metallizing at least a portion of the previously treated surface by depositing metal vapor under low pressure, thereby forming chemical bonds between the intermediate polymer layer and the metal layer that is formed.

Depending on the nature of the polymer, the preparation used for sizing purposes, referred to as the "deposition preparation", may be made in an aqueous dispersion or an aqueous solution or in a dispersion in an organic solvent such as an alcohol, a ketone, . . . .

The components of the deposition preparation for the polymer are as follows:
  a polymer binder possessing reactive functions;
  a coupling agent for providing the textile-to-polymer bond;
  a coupling agent for providing the polymer-to-metal bond; and
  a flame retardant agent, e.g. of the phosphorus and/or nitrogen type.

It is possible for the coupling agent used for making the textile-to-polymer bond to be identical to or different from the agent used for making the polymer-to-metal bond.

The coupling agents may be silanes, titanates, zirconates, aluminates, or organochromium complexes.

As examples of titanates or zirconates, mention may be made of compounds having the formula $(XO)_n Z(OY)_{4-n}$, where X is an alkyl group, e.g. n-propyl, iso-propyl, n-butyl, or iso-octylethyl, Y is an organofunctional group, e.g. of the carboxyl, ester, phosphonate, pyro-phosphonate, or sulfonate type, and Z is Ti for titanates or Zr for zirconates, and $\underline{m}$ lies in the range 1 to 3. Complete ranges dedicated to each type of polymer are available from the following suppliers: Famas Technology, Capatue Chemical . . . .

In preferred manner, the coupling agents are organosilanes carrying one to three OH or alkoxy functions, and at least one organic portion R possessing a function enabling them to be covalently grafted to the polymer. They are usually organosilanes carrying one to three OH or alkoxy functions (where alkoxy functions hydrolyze in an aqueous medium to form OH functions), of formula that can be represented by $(R'O)_m—Si(R)_{4-m}$ with $\underline{m}$ lying in the range 1 to 3, R' that may be H or an alkyl group, in particular a group having 1 to 4 carbon atoms. It is possible for a single silicon atom to carry different OR' and/or R groups. At least one of the organic portions R possesses a function enabling it to be grafted to the polymer. The choice of this function thus depends on the nature of the polymer and on the reactive functions that it carries. For example, if the polymer is a polyurethane, then the organic portion R will contain an amine function or an epoxy function. Complete ranges of organosilanes dedicated to each type of polymer are available from the following suppliers: Dow Corning, Wacker, Momentive, and Shin-Etsu. The chemical bonds with the inorganic compounds (fibers and metal) can then be made via OH functions carried by the atom of Si and that remain free on the polymer.

During the operation of preparing the bath, the coupling agents react with some of the reactive functions of the polymer in order to form a modified polymer enabling the textile layer to be chemically coupled with the metal layer. Advantageously, this "coupling polymer" is used at very low concentration, in particular representing about 5% to 6% by weight of the final metallized textile. The presence of a flame retardant makes it possible to mitigate the degradation to fireproofing properties that is associated with the presence of organic compounds.

Advantageously, the deposition preparation prepared in step a) is made with 1% to 10% coupling agent(s), 50% to 80% reactive function polymer(s), 5% to 40% flame retardant agent(s), and 0.1% to 10% formulation agent(s), these percentages being given for dry matter relative to the total weight of the dry matter corresponding to the deposition preparation. Preferably, the deposition preparation prepared in step a) is made with 1% to 5% coupling agent(s), 70% to 80% polymer(s), 15% to 25% flame retardant agent(s), and 0.1% to 1% formulation agent(s), these percentages being given for dry matter, relative to the total weight of the dry matter corresponding to the deposition preparation. It is possible to incorporate any type of formulation agent conventionally used in polymer deposition, e.g. of the anti-foaming agent type, wetting agent type . . . .

In order to guarantee a uniform distribution of the flame retardant agent, which is generally the form of particles, the deposition preparation is preferably subjected to stirring before it is applied.

Advantageously, the deposition preparation contains an anti-foaming agent. It is possible to use any conventional anti-foaming agent well known to the person skilled in the art, and most advantageously it is possible to use agents of the polysiloxane family and in particular BYK™-094 sold by BYK Chemie, or of the family of polyether siloxane copolymers, and in particular TEGO™ Foamex 825 sold by the supplier DEGUSSA.

The polymer deposition preparation is then applied on a textile layer that has already been prepared.

The polymer deposition preparation may be applied using any conventional technique for treating textile material, conventionally referred to as sizing: full-bath impregnation followed by mangle drying, coating with a scraper, spraying . . . . Techniques enabling the polymer layer to be deposited on only one of the faces of the textile are preferred. It is possible to use a deposition method followed by mangling. Mangling enables excess polymer to be eliminated on rollers (or "mangles" in the language of the art).

The following treatment has two purposes: eliminating the dispersive medium or solvent used in preparing the polymer deposition preparation, and activating coupling functions in order to lead to the desired chemical bonds. These coupling functions, in particular of OH type, come from the coupling agent that is selected in particular from silanes, titanates, zirconates, aluminates, and organochromium complexes that, after bonding to the polymer, serve to form the coupling polymer. The heat treatment serves mainly to establish the bond between the polymer layer and the textile. It can also lead to coupling functions that might be present in the polymer being unblocked so as to enable it to couple subsequently with the metal.

The conditions of this heat treatment depend on the composition of the coupling polymer deposition preparation. For example, by using an aqueous polymer deposition preparation and coupling agents of silane type carrying alkoxy functions, —C(O)OH functions, or —C(O)OR" functions, where R" represents an alkyl group, or of silane type carrying amine or epoxy functions for reacting with the polymer, which have led to the coupling polymer being formed in the deposition preparation, it is appropriate to use heat treatment at a temperature in the range 100° C. to 170° C., for a period of 30 seconds (s) to 2 minutes (min).

The operation of metallization on the surface of the polymer-covered textile is then performed using any known technique, and preferably depositing metal under low pressure from metal vapor, conventionally referred to as vacuum metal deposition. This deposition of metal is generally performed on only one of the faces of the textile. Thus, under such circumstances, when the coupling polymer has been deposited over the entire surface of the textile (as happens in particular by impregnation in a bath), one of the large faces of the textile is covered in coupling polymer and the other large face is covered in coupling polymer, itself covered in a layer of metal. Conventionally, a pressure lying in the range $10^{-2}$ Torr to $10^{-4}$ Torr and a temperature lying in the range 30° C. to 100° C. are applied during metallization. The person skilled in the art should adapt the pressure and the temperature as a function of the metal used. During this metallization, the coupling functions remaining on the polymer layer form chemical bonds with the metal. Perfect cohesion is thus obtained between the textile backing and the metal layer, with this being provided by the intermediate polymeric layer. A metal layer is thus obtained generally having a thickness lying in the range 5 nanometers (nm) to 100 nm. In the end, the resulting metallized textile is usually made up of:

- 5 to 7 parts by weight of coupling polymer;
- 0 to 3 parts by weight of flame retardant agent;
- ≤0.5 parts by weight of metal constituting the metal layer, in particular the metal will be present at 0.01 to 0.5 parts by weight; and
- 90 to 95 parts by weight of inorganic fibers making up the textile layer, for a total of 100 parts.

The invention may be used in particular for making sun protection textiles, and in particular fabrics for blinds or curtains. The metal layer is perfectly bonded to the textile. Furthermore, the presence of flame retardant agent(s) and the low content of organic compounds resulting from this treatment also make it possible to guarantee the required fireproofing properties.

Prior to performing the treatment of the invention, the textile may be subjected to a dyeing operation by being treated with a dye formulation. In general, such a formulation is in the form of a dispersion of coloring materials in a dispersion of a binder in aqueous phase. The dry matter of the formulation is usually less than 10% by weight, leading to a textile layer having 0.5% to 1% dry matter of dye formulation, thus leaving the inorganic fibers accessible for bonding with the coupling polymer. Nevertheless, if prior dyeing is performed, the coupling polymer can also make bonds with the binder of the dye that is locally present at the surface of the textile layer. Furthermore, the metallized fabric obtained in the context of the invention may be treated by depositing varnish on the surface of the metallized layer, in particular in order to avoid it oxidizing and/or corroding. Such varnishes are in particular of the following types: polyurethane, polyacrylic, polyvinyl, silicone, or epoxy. When such a varnish is applied on the metallized layer, it generally represents less than 1% of the total weight of the final textile, generally lying in the range 0.2% to 0.6%. Such operations may be performed using conventional techniques that are well known to the person skilled in the art, in particular the art of fabricating textiles for sun protection.

The following examples serve to illustrate the invention.

TREATMENT EXAMPLE 1

Composition of the Bath

| Raw material type | Chemical nature Commercial reference | Percentage by weight |
|---|---|---|
| Polymer binder | polyurethane BAYER Impranil ® DLN | 45.90 |
| Coupling agent | 3-glycidoxypropylmethyl-diethoxysilane MOMENTIVE Coatosil ® C2287 | 0.70 |
| Flame retardant | phosphorus nitrogen flame retardant THOR PCO 900 | 5.00 |
| Anti-foaming agent | poly dimethyl siloxane BYK Chemie Byk 094 | 0.10 |
| Dispersive medium | Water | 48.30 |
| TOTAL | | 100.00 |

The deposition preparation was prepared by adding in succession to the necessary quantity of water maintained under stirring: BYK 094, Impranil® DLN, and Coatosil® C 2287. Stirring was then maintained for 48 hours (h) at a speed of 300 revolutions per minute (rpm) (for vortex creation). The pH was monitored at t=0, t=24 h, and then t=48 h: the pH needs to increase by at least one pH unit by the end of 48 h, which is indicative of the polyurethane bridging with the silane.

Once that step had been completed, PCO 900 was added progressively into the previously obtained preparation while stirring at a speed of 300 rpm for 1 h.

The mixture could then be applied on the fabric to be treated.

TREATMENT EXAMPLE 2

The treatment was applied to a fabric that had previously received a dye.

The dye possessed the following composition:

| Raw material type | Chemical nature Commercial reference | Percentage by weight |
|---|---|---|
| Wetting agent | Non ionic CLARIANT Hostapal NAN | 0.50 |
| Anti-foaming agent | HUNTSMAN Albaflow FF01 | 0.5 |
| Polymer binder | Poly hydroxyl ether INCHEMREZ PKHW38 | 12 |
| Medium | Water | 87.45 |
| TOTAL | | 100.00 |
| Coloring agent (s) | Depending on the looked-for tint | <5 |

The dye was deposited dry on the fabric at about 1 gram per square meter ($g/m^2$) to 2 $g/m^2$, i.e. 0.5% to 1% of the weight of the fabric as obtained after dyeing.

The fabric as obtained in this way then received treatment identical to that described in example 1.

TREATMENT EXAMPLE 3

Composition of bath 1 (hydrolyzing silane: Coatosil® MP 200)

| Raw material type | Chemical nature Commercial reference | Percentage by weight |
|---|---|---|
| Coupling agent | 3-glycidoxypropylmethyl-diethoxysilane MOMENTIVE Coatosil ® MP 200 | 30 |
| Acid | Acetic acid solution (90% water/10% acetic acid by weight) | 10 |
| Dispersive medium | Water | 60 |
| TOTAL | | 100.00 |

Method of Operation

Coatosil® MP 200 was introduced into a container provided for this purpose (e.g. a plastic drum). The water and acetic acid solution was added under stirring, mixing for 10 minutes (min) at a speed of 200 rpm. 10% of the water was added progressively (2% by 2%) under stirring, then 10% of the water, then the remainder of the water (40%) while continuing stirring. Stirring was maintained for 3 h while verifying pH. The pH was close to 3 (revealing hydrolysis of the Coatosil® MP 200).

After hydrolysis of the Coatosil® MP 200, a compound was obtained having the following formula:

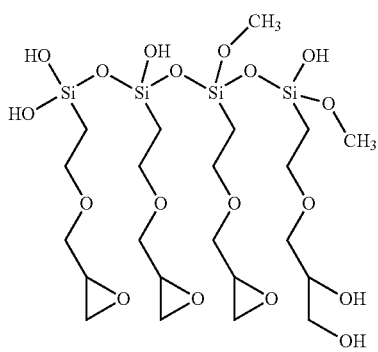 [SMILES: CO[Si](O)(CCOCC(O)CO)O[Si](CCOCC1CO1)(OC)O[Si](O)(CCOCC1CO1)O[Si](O)(O)CCOCC1CO1]

Composition of Bath 2 (Deposition Preparation)

| Raw material type | Chemical nature Commercial reference | Percentage by weight |
| --- | --- | --- |
| Polymer binder | polyurethane BAYER Impranil® DLN | 45.90 |
| Coupling agent | 3-glycidoxypropylmethyl-diethoxysilane MOMENTIVE Coatosil® MP 200 (ES: 30%) - mixture 1 | 2.4 |
| Flame retardant | Phosphorus nitrogen flame retardant THOR PCO 960 | 5.00 |
| Anti-foaming agent | poly dimethyl siloxane BYK Chemie Byk 094 | 0.10 |
| Dispersive medium | Water | 46.60 |
| TOTAL | | 100.00 |

The deposition preparation was prepared as in Example 1.
Treatment Conditions:
  Stirring speed while preparing the bath: 450 rpm.
  Type of blade: rotor/stator.
  Maturation of bath: 48 h.
  Type of treatment of the textile surface:
    full-bath followed by mangle drying;
    closure pressure of the mangle cylinders: 16 Newtons per millimeter (N/mm);
    temperature of the batch: 16° C.;
    treatment speed: 12 meters per minute (m/min).
Heat Treatment:
  160° C.-1 min 20 s.
Vacuum Metallization:
  Vacuum metallization performed 7 days after treating the fabric.
  Method in three stages:
    drying the fabric: 105° C.-2 min;
    plasma treatment: plasma temperature 900° C. to 1000° C.—treatment time <1s;
    vacuum metallization: P0: $10^{-3}$ Torr.
Characterization of Fabrics:
  Weight of fabric before treatment: 149 g/m².
  Weight of treated fabric: 160 g/m².
  Thickness of finished product: 0.21 millimeters (mm).

Fire behavior: M0 in accordance with the standard NFP 92507—"Euroclass" classification in accordance with the standard EN 13.501-1: A2s1d0 in both cases.

Once metallization had been performed, a protective varnish was also applied to the fabric obtained in accordance with Example 1. That serves to avoid any corrosion/oxidation phenomenon of the aluminum and thus any loss of performance for the fabric in terms of its thermal/optical properties. The varnish was applied by the mangle method (full-bath impregnation).

The composition of the varnish was as follows:

| Raw material | % by weight of the formulation |
| --- | --- |
| Water | 89.95 |
| Impranil® DLN Polyurethane (40%) | 10 |
| Byk 094 polydimethyl siloxane (100%) | 0.05 |
| TOTAL | 100 |

The dry deposit of varnish on the fabric was 0.5 g/m², i.e. 0.3% by weight of the final fabric.
Measuring Rs (Over a Wavelength Range of 250 nm to 2500 nm)

| | Before varnish | After varnish |
| --- | --- | --- |
| Rs (%) | 73.4 | 70 |

Fire Properties

The varnish applied to the fabric does not degrade its fire properties. The amount of organic material added to the fabric is practically negligible, thus making it possible to conserve the M0 and A2s1d0 fire classification.

The invention claimed is:

1. A textile metallized on at least one of its faces, the textile comprising:
  a textile layer of inorganic fibers, and
  a metallic layer,
  wherein a connection between the textile layer and the metallic layer is provided by a polymeric intermediate layer formed by a matrix having at least one coupling polymer in which at least one flame retardant agent is distributed,
  wherein said coupling polymer is bonded by chemical bonds to the textile layer and to the metallic layer.

2. The metallized textile according to claim 1, wherein the chemical bonds existing between the coupling polymer and the textile layer, and chemical bonds existing between the coupling polymer and the metallic layer, are covalent bonds, hydrogen bonds, or polar bonds.

3. The metallized textile according to claim 1, wherein the textile is a woven fabric, a non-woven fabric, or a grid of glass fibers.

4. The metallized textile according to claim 1, wherein the metal constituting the metallic layer is aluminum.

5. The metallized textile according to claim 1, wherein the chemical bonds existing firstly between the coupling polymer and the textile layer, and between the coupling polymer and the metal layer, are provided by M-OH functions carried by the polymer layer, or by O-M-O covalent bridges, where M=Al, Zr, Ti, or Si.

6. The metallized textile according to claim 1, wherein the polymeric intermediate layer is constituted by one or more polymers having reactive functions selected from the following monovalent or divalent groups: hydroxy, carboxylic acid, amine, amide, acid anhydride, isocyanate, epoxy, caprolactam, and carbodimide.

7. The metallized textile according to claim 1, wherein the polymeric intermediate layer is a polymer selected from: polyesters, polyamides, polyurethanes, polyolefins, and mixtures thereof.

8. The metallized textile according to claim 1, wherein the flame retardant agent represents 20% to 25% by weight of the weight of the polymeric layer.

9. The metallized textile according to claim 1, wherein the coupling polymer represents 1% to 25% by weight of the total weight of the metallized textile.

10. The metallized textile according to claim 1, having a reflecting portion of solar radiation index greater than, or equal to, 70%.

11. The metallized textile according to claim 1, wherein the metallic layer is covered in a varnish in order to avoid oxidation and/or corrosion of the metallic layer, the varnish representing less than 1% by weight of the weight of the textile.

12. A method of fabricating a metallized textile according to claim 1, the method comprising the following successive steps:
   a) preparing a solution or a dispersion including at least one flame retardant agent, and a coupling polymer or a mixture of coupling polymers, said coupling polymer or said mixture of coupling polymers carrying coupling functions capable of making chemical bonds between the polymer and the inorganic textile fibers, and coupling functions capable of making chemical bonds between the polymer and the metal, which functions may be identical or different;
   b) sizing one of the faces of the inorganic fiber textile layer with the solution or dispersion prepared in step a);
   c) applying heat treatment serving to fix the coupling polymer chemically to the surface of the textile layer so as to fix an intermediate polymer layer on the textile layer; and
   d) metallizing at least a portion of the previously treated surface by depositing metal vapor under low pressure, thereby forming chemical bonds between the intermediate polymer layer and the metal layer that is formed.

13. The method according to claim 12, wherein the solution or dispersion prepared in step a) is made with 1% to 10% of a coupling agent, 50% to 80% of a reactive function polymer, 5% to 40% of a flame retardant agent, and 0.1% to 10% of a formulation agent, these percentages being given for dry matter relative to the total weight of the dry matter corresponding to the prepared solution or dispersion.

14. The method according to claim 13, wherein the coupling agent is selected from the group consisting of silanes, titanates, zirconates, aluminates, and organochromium complexes.

15. The method according to claim 13, wherein the coupling agent is selected from organosilanes carrying one to three OH or alkoxy functions, and at least an organic portion R possessing a function enabling them to be covalently grafted to the polymer having reactive functions.

16. The method according to claim 12, wherein step d) is followed by a step of depositing a varnish on the surface of the metallized layer in order to avoid at least one of oxidizing and corroding of the surface of the metallized layer.

17. The method according to claim 12, wherein step b) is preceded by an operation of dyeing the textile layer, leaving the textile fibers of the textile layer accessible for bonding with the coupling polymer.

18. The method according to claim 12, wherein step b) is preceded by an operation of dyeing the textile layer, leaving the textile fibers of the textile layer accessible for bonding with the coupling polymer, said dyeing operation being performed by treating the textile layer with a dyeing formulation leading to a textile layer including 0.5% to 1% dry matter of the dye formulation.

* * * * *